Jan. 14, 1964 A. N. ANDREWS 3,118,020

TELEPHONE NUMBERS ACTUATING DEVICE

Filed Dec. 2, 1959 2 Sheets-Sheet 1

INVENTOR:

Anatol N. Andrews

Jan. 14, 1964 A. N. ANDREWS 3,118,020

TELEPHONE NUMBERS ACTUATING DEVICE

Filed Dec. 2, 1959 2 Sheets-Sheet 2

INVENTOR:

Anatol N. Andrews

Patented Jan. 14, 1964

United States Patent Office 3,118,020

1 | 2

3,118,020

TELEPHONE NUMBERS ACTUATING DEVICE

Anatol N. Andrews, 6033 Dauphin Ave., Los Angeles, Calif.

Filed Dec. 2, 1959, Ser. No. 856,683
4 Claims. (Cl. 179—90)

This invention pertains to automatic dialing of one or more of telephone digits via conventional telephone apparatus and is a telephone numbers actuating device which mechanically depends on a plurality of separate electric motors and circuit arrangements instead of on conventional mechanical carriers and components such as clutches, cables, pulleys, ratchets, centrifugal governors, meshing gears and like.

It has been found that dialing of a telephone number comprising more than one digit on a conventional telephone apparatus may be accomplished without removing dialing finger from engaged thereby single dial-finger-hole, for example, when dialing finger is inserted into dial-hole which dormantly is directly under the dial-finger-stop a telephone number, for instance, 113 may be dialed by said finger from said point by first rotating the dial clockwise 3/12 of the dial circumference, then relaxing the finger and letting it be carried back by the dial spring, then again rotating the dial the same distance and again letting the dial spring carry the finger back, then rotating the dial 5/12 of dial circumference and from there letting the finger be carried back by the dial spring.

Following the same procedure, dialing the telephone dial 4/12 of its circumference and returning it to original position would actuate digits "ABC 2," 6/12—digits "GHI 4," 7/12—"JKL 5," 8/12—"MNO 6," 9/12—"PRS 7," 10/12—"TUV 8," 11/12—"WXY 9," 12/12—"Z-operator-0."

It has been further found that in normal dialing it takes slightly less than one second to rotate telephone dial 12/12 of its circumference. It takes about twice as long for the dial to return back to original position by means of the dial spring carrying additional dead load, for instance, of a relaxed finger in the dial hole. Taking the above said into consideration, among the objects of this invention are:

To substitute human finger for dialing telephone apparatus with a mechanical finger operatively permanently inserted into one dial hole, preferably the hole dormantly over "Z-operator-0," and to secure said mechanical finger with and parallel to an electric motor axle aligned with dial axle, said electric motor being the dial turning motor and of speed comparable with speed of normal dialing, for instance, 60 revolutions per minute, for turning said dial via said finger when said motor is actuated to a circumferential distance dependant upon the length of time said motor remains actuated, and to provide automatic means for governing said time-table in conjunction with telephone apparatus operating restrictions and dial requirements.

To provide said governing means comprising a separate second electric motor of turning speed conjunctive with turning speed of the dial turning motor, a conductive springy hand perpendicularly secured to extended motor axle of the second motor and having its loose end inverted, a non-conductive face secured in position for the hand-inverted-end to rotate thereover in contact therewith when said second motor is actuated, conductive plates of various widths and securable circumferentially over said face under the path of the hand-inverted-end and there separated from each other, an electric circuit arrangement for connecting conductive plates respectively with a first terminal of the dial turning motor, an electric circuit for connecting a second terminal of the dial turning motor with first pole of electric energy and with a first terminal of the second motor, an electric circuit for connecting a second terminal of the second motor and the hand with second pole of electric energy, electric switches for closing and opening electric circuit for actuating and de-actuating the second motor, and the turning speed of the latter in conjunction with the hand-inverted-end and its movement over width of a conductive plate govern the length of time the dial turning motor remains actuated which determines in the instance the extent of the dial clockwise advance from its dormant position.

To provide additional motor or motors for moving component or components, secured with said lever or levers, over another component or components, the subjective length of travel cooperating in each instance with required circumferential length of dial travel and with turning speed of involved motors.

To provide means for manually pre-setting by one lever thereafter automatic actuation of priorly predetermined telephone number of one or more digits, or any one of a plurality of such numbers, or successively several of or all of such numbers.

To provide means for manually pre-setting by a plurality of levers thereafter automatic actuation of any desired, at the pre-setting time, telephone number of one or more digits.

To provide means for manually pre-setting by a plurality of levers thereafter automatic actuation of a plurality of any desired, at the pre-setting time, telephone numbers each of one or more digits.

To make a device incorporating principles of this invention simple and dependable, adaptable for useful purpose, easy to operate and maintain, and susceptible of easy and inexpensive manufacture.

To illustrate, as an example, how the aforesaid and other objects of this invention may be practically achieved, reference now is being made to the accompanying drawings.

Figures 1, 2, 3:
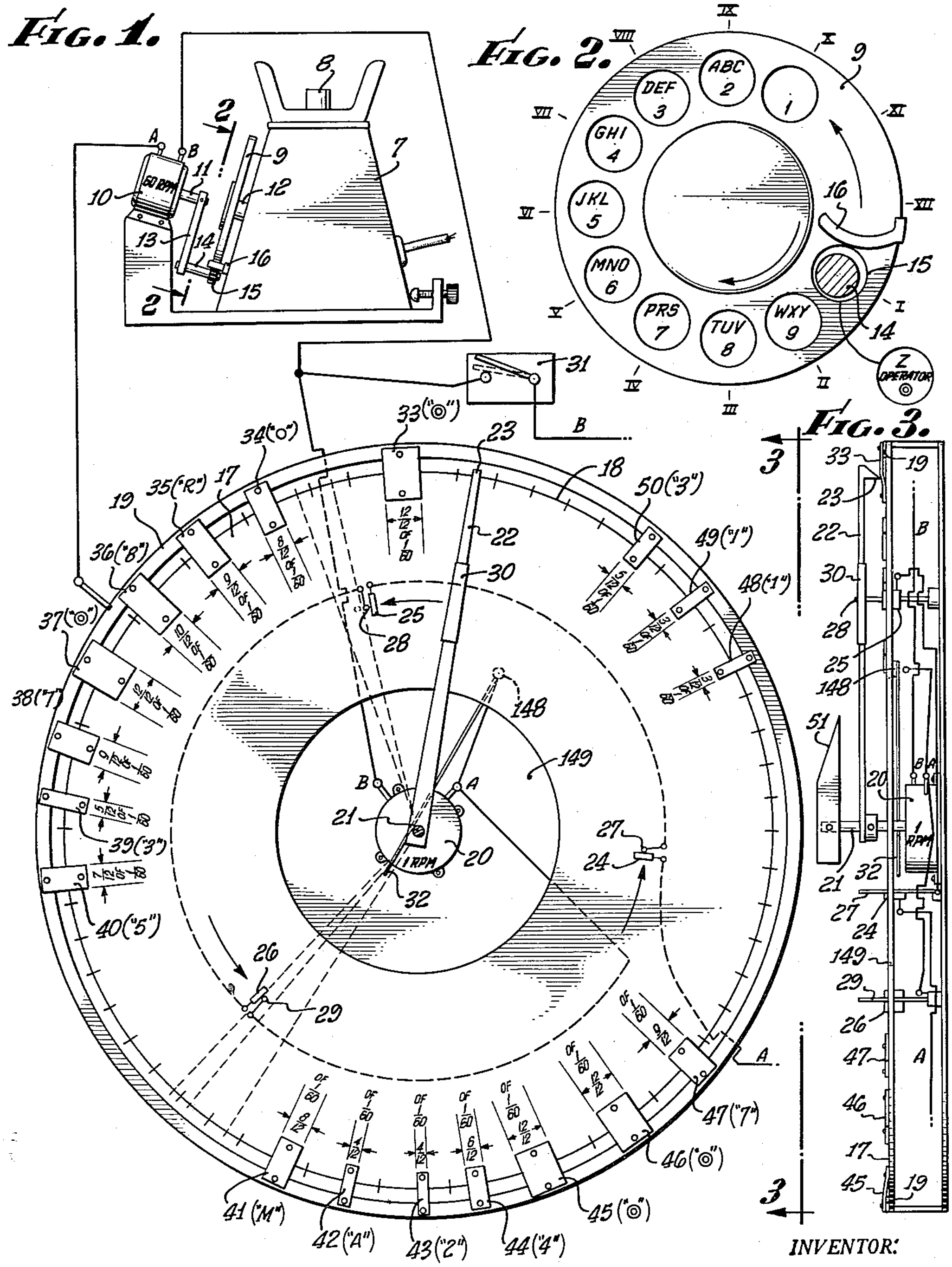
FIGURE 1 is a plan view of a device incorporating princples of this invention including dial motor and remote instrument panel with means for manually pre-setting of automatic actuation of priorly predetermined telephone number or numbers.
FIGURE 2 is front view of telephone dial, marks on dial face, and cross-section of mechanical finger, taken at 2—2 of FIGURE 1.
FIGURE 3 is a side view of the pre-setting panel and of the actuating and de-actuating mechanism, taken at 3—3 of FIGURE 1.

In FIGURE 1 dial-type telephone apparatus 7 has its transmitter switch 8 closed (by having weight removed therefrom), its dial 9 is in starting position. Contraclockwise electric motor 10 of 60 revolutions per minute when actuated is secured opposite dial 9 and has its axle 11 aligned with dial axle 12; perpendicular arm 13 is firmly secured by one of its end sections with axle 11, facing dial 9; finger 14 is perpendicularly and rotatably secured to the other end section of arm 13; the loose end of said finger 14 is operatively permanently inserted into dial hole 15 which is directly under dial stop 16 (FIGURES 1 and 2), said dial hole 15 is the dial hole dormantly over dial face space marked "Z–operator–0". Circumferential nonconductive plate 17 is of over 6″ in diameter and has marked circumference 18 of exactly 6″ in diameter, wherefore its circumferential length is 18.8496″ and is divided into 60 equal circumferential lengths, each 0.31416″, approximately 5/16″, circumferentially long.

Conductive ring 19, of more than 6″ in diameter (for instance, 6¼″ dia.) is secured to and over the edge section of the nonconductive plate 17 so as to be substantially removed from said marked circumference 18.

Electric motor 20 of one revolution per minute when actuated is secured behind the middle section of plate 17, and its axle 21 extends forwardly through circumferential opening 149 therein. Conductive springy hand 22 is secured with axle 21 and extends to the marked circumference 18 and is resilient thereagainst and slidingly touches it by perpendicularly pointed end 23 (FIGURE 3). Switches 24, 25 and 26 may be secured circumferentially as shown, and may have respectively very thin springy switch levers 27, 28 and 29 protruding into the rotary path of hand 22. Nonconductive sleeve 30 may be secured over section of hand 22 which would come in contact with said switch levers 27, 28 and 29 when hand 22 is rotating, for insulating hand 22 from said levers. Electric current to motor 20 is supplied via wires A and B. Wire B travels via manually or otherwise operatable switch 31 which, when closed, connects wire B with terminals B of motor 20 and of dial motor 10, respectively. Wire A travels through switches 24, 25 and 26 which, when closed, connect wire A with terminal A of motor 20 thus causing hand 22 to rotate, for instance, contraclockwise, as indicated, until hand 22 meets either of the levers 27, 28 or 29, depending from where said hand 22 starts on circumference 18. Slight pressure by hand 22 against either of said levers would open their respective switch thus breaking the electric circuit and causing hand 22 to stop. Evidently, if desired, manually or otherwise engageable bridge switches may be provided to neutralize any one or all of said switches 24, 25 and/or 26 in conjunction with an appropriate timing device or devices, in which case hand 22 would, of course, continue, when required, to rotate by bending either of the so neutralized levers 27, 28 or 29, the latter, being resilient, would return to original protruding and respective-switch-closing positions after being by-passed by hand 22.

Terminal A of motor 20 is conductively connected with terminal 148 wherefrom a springy conductive wire 32 is extended resiliently against conductive axle 21. Terminal A of dialing motor 10 is conductively connected with conductive ring 19, therefore, if a conductive flat component would be extended from ring 19 to and over marked circumference 18, the dialing motor 10 would become actuated as soon as hand 22 comes in contact with such conductive component, and would continue to be actuated as long as it takes for hand 22 to slide over the circumferential width of such conductive component. If said width, for instance, is 1/60 of circumference 18, the dialing motor 10 would remain actuated for exactly one second which would allow it to make its full turn whereby finger 14 would turn dial 9 from original position all way to and against dial stop 16, by then hand 22 would leave said conductive component which would immediately break circuit to motor 10, then the telephone dial recoiling spring would become free to carry dial 9 and the, then dead, finger 14 to original position. As soon as the latter happens the telephone dial digit, either "Z" or "0" ("operator"), would be actuated, and, if no further dialing occurs, the telephone contact with the telephone operator would be thereby established.

In FIGURE 1 thin, flat conductive plates 33, 34, 35, 36, 37, 38, 39, 40, 41, 42, 43, 44, 45, 46, 47, 48, 49 and 50 of various widths are removably secured (for instance, by screws) to conductive ring 19 and to nonconductive plate 17 in such manner that they flatly overlap respectively the marked circumference 18 and threfore will be traveled over by pointed end 23 of rotating hand 22. Each and all of said plates are removed from each other by a nonconductive face distance substantially greater than 1/60 of circumference 18, therefore it would take hand 22 substantially more than one second to move over each of said separating distances during which time dialing motor 10 would be evidently de-actuated for a sufficient time for recoiling of dial 9 to original position after each successive actuation while pointed end 23 of hand 22 travels over anyone of said conductive plates (33–50).

Plate 33 is located to the right of switch 25 and is of width exactly 1/60 of circumference 18, therefore, when motor 20 is actuated, the pointed end 23 of hand 22 will start rotating contraclockwise from shown position, in about 1½ seconds it will come in contact with plate 33, it will travel thereover for exactly one second during which time the telephone dial 9 will make full turn to dial stop 16, by then hand-point 23 will leave plate 33 thus de-actuating motor 10 for substantially more than one second, during which time the dial recoiling spring will return dial 9 and finger 14 to original position while hand 22 continues to rotate and eventually will come in contact with switch lever 28 of switch 25; the lever 28, under rotating pressure by hand 22, will open switch 25 thus de-actuating motor 20. Then the telephone contact with telephone company operator will become established.

Plates 34, 35, 36, 37, 38, 39 and 40 are located between switches 25 and 26, and are respectively of various indicated widths in relation to circumference 18, for instance, they may be as follows: plate 34—8/12, plate 35—9/12, 36—10/12, 37—12/12, 38—9/12, 39—5/12, 40—7/12, of 1/60 of circumference 18, respectively.

If switch 31 is opened and then hand 22 is manually moved to a starting position between switch lever 28 and plate 34, and, thereafter, switch 31 is closed either manually or by other means in conjunction with some automatically actuating condition, for instance, a delay action relay, or fire or disturbance actuatable relay, or, if switch 31 remained closed but switch 25 became bridged or closed by likewise means, then hand 22 will start rotating towards and then over plate 34, the distance between the latter and plate 35, over the latter and so forth until it meets lever 29 of switch 26. During said travel hand 22 will first actuate motor 10 for 8/12 of its complete turn, then de-actuate it for 1¼ seconds, then actuate it for 9/12 of its complete turn, de-actuate again for over a second, then actuate it for 10/12, de-actuate for over a second, then actuate it for its complete turn, de-actuate it for over a second, actuate for 9/12, de-actuate, actuate for 5/12, de-actuate, actuate for 7/12, of its turn, and then de-actuate lastingly. Resultant thereof a compound telephone number "OR 8 0735" will become actuated and contacted via apparatus 7.

Travel of hand 22 over the distance between switch 26 and switch 24 will result in actuating and establishing telephone contact with compound telephone number "MA 2 4007"; travel of hand 22 over and between plates 48, 49 and 50 will establish telephone contact with telephone company information (dial "113") and so forth since, evidently plates 33–50 may be removed and replaced with other similar plates of various appropriate respective widths to form other predetermined telephone number or numbers each comprising either one or more digits for later automatic dialing of any one, or successively some or all of such numbers, by manually presetting hand 22, and/or by bridging or closing one or more of switches 24, 25, 26 and like, at any desired or required time and/or responsive to any predetermined conditions, by subjecting switch 31 and/or switches 24, 25, 26 and like, to operating either by hand or by automatic relays responsive to various devices and/or causes.

A nonconductive knob 51, shown in FIGURE 3, and pointed at one end may be secured to and over the protruding end of conductive axle 21 for safety and convenience of pre-setting manually conductive hand 22 to a desired position over panel plate 17 by turning knob 51 contraclockwise.

Evidently, if desired, a nonconductive panel-board-cover may be removably secured over panel plate 17 and the conductive hand 22 under knob 51, and have its face appropriately marked to guide the setting of knob 51 to a required position while hand 22 and panel plate 17 are being concealed under such panel board cover.

Figures 4, 5:
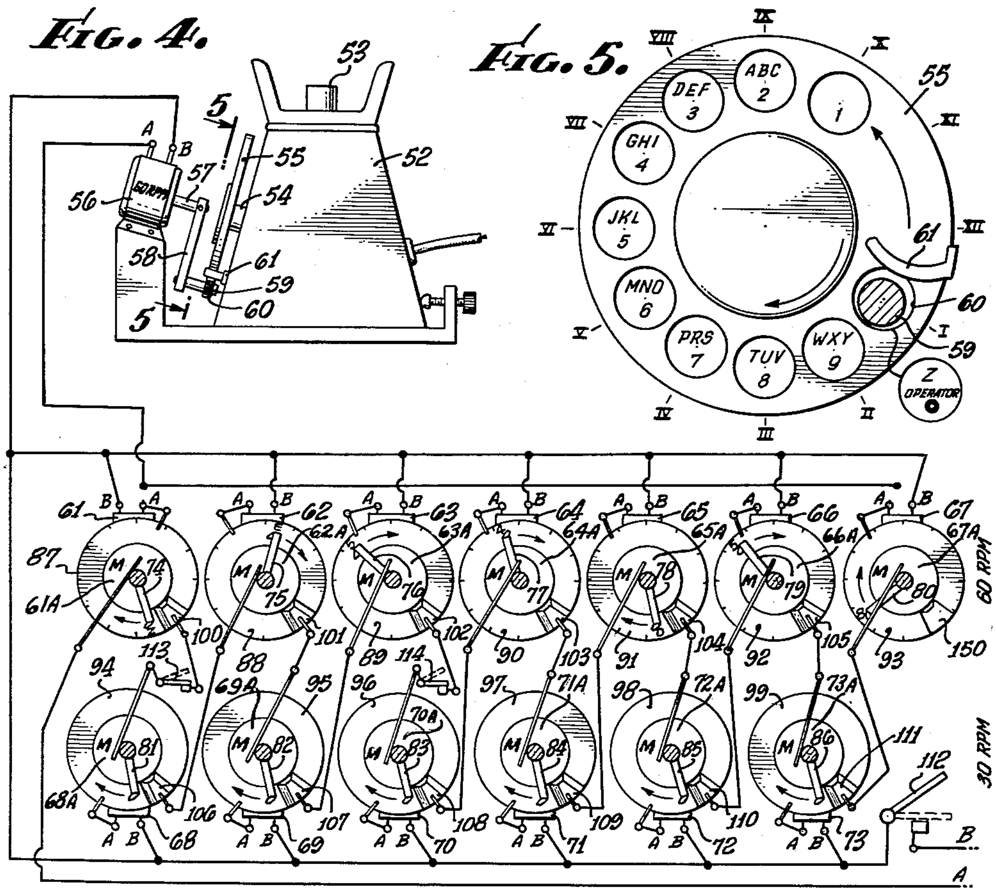
FIGURE 4 is a plan view of modified device incorporating principles of this invention including dial motor and remote instrument panel with means for manually presetting of automatic actuation of any desired, at the pre-setting, telephone number.
FIGURE 5 is a front view of a telephone dial, marks on dial face, and cross-section of mechanical finger, taken at 5—5 of FIGURE 4.

In FIGURE 4 the telephone apparatus 52, its transmitter switch 53, dial axle 54, dial 55, dial hole 60, dial stop 61, the electric dial motor 56 of 60 revolutions per minute when actuated, its axle 57, arm 58 and finger 59 are substantially the same, for the same purpose and in the same relative positions, conditions and relationships with each other as in reference to such similar components in FIGURE 1.

Below the apparatus 52 are shown thirteen circumferential units. Each of said units comprises a small electric motor. Each of said motors is labeled with letter M. There are thirteen of said motors, one in each of said units. Said motors are further, separately, identified by individual labels, i.e. numbers 61A to 73A inclusive respectively; said motors may be, for instance, of the available type each 1¾" in diameter and 1¼" deep, and may be secured to a suitable panel-back-board. The upper seven of said motors (61A–67A inclusive) may be each of 60 revolutions per minute when actuated to complete turn in 1 second like the dial motor 56, while the lower six motors (68A–73A incl.) may be slower, for instance, each of 30 revolutions per minute when actuated to complete turn in 2 seconds. (Of course, all of the aforesaid motors 61A–73A and including dial motor 56, may be each and all of the same speed, in which case, however, said speed should be not over 30 revolutions per minute to insure enough time for recoiling spring to recoil dial 55 after it has been actuated.)

Each of motors 61A to 73A inclusive has a nonconductive front face circumference of tangible thickness, through the center section of each of said circumferences loosely protrudes conductive axle of the motor; over a substantial edge section of each of said circumferences is circumferentially secured thin flat conductive plate, like either of plates 87 to 99 inclusive, each of circumferential length of 11/12 of the total circumference; within the middle of slightly concaved remaining 1/12 of said face circumference is secured thereover at the bottom therein (except in such section on the face of motor 67A) a conductive plate like either of the plates 100 to 111 inclusive, each of width less than said 1/12 of said circumference to allow such plate to cave in and to be insulated on each sloping side from the longer plate.

Each of said motors (61A–73A) has a dependently narrow conductive springy lever-hand, like either of the hands 74 to 86 inclusive, secured with respective conductive axle and extended over said front-face circumference to and resiliently against latter's edge proximity for contact, when rotated, with the longer or the shorter of the aforesaid conductive plates, except in reference to motor 67A where on its face-circumference such shorter conductive plate is absent and where such lever-hand 80, when rotated, will be either in contact with plate 93 or with the nonconductive concaved surface 150 of the section of the circumference within the typical break in said plate 93.

For reasons explained below, each of said circumferential units comprises a conventional solenoid operated relay or switch for closing and opening electric circuit and secured in the back of each of said units, though, in modification shown in FIGURE 4, only the respective relays of the upper units are connected with the dial turning motor 56.

The outer frames of each of all of said relays (or switches) are respectively visible from the front of said units as extending from behind their respective circumferences, and are labeled 61–73 respectively. Each of said relays (or switches) are substantially alike to each other.

In the modification shown in FIGURE 4, relays (switches) 68–73, for purpose stated below, are in substantially the same relationship respectively with respective motors 68A–73A and plates 94–99 as relays (switches) 61–67 with motors 61A–67A and plates 87–93, but here relays 68–73 are not connected with dial turning motor 56; however, it is advisable to have them in said readiness in case some telephone company would require replacement of the one-way dial turning motor 56 with a reversible type dial turning motor, for subsiding or substituting the actions of the dial recoiling spring in the telephone apparatus. In case of such demand by the telephone company, the dial turning motor 56 can be easily substituted with, for instance, commonly available Merkle-Korff's models SG–15 or SG–10 reversible motors, and the relays 68–73 would be ready for connecting their outgoing terminals A with the reversing terminal A of such reversible dial turning motor.

While, undoubtedly, the modification shown in FIGURE 4, with the one-way dial turning motor 56, is self-evidently simpler, fully practical and cheaper to manufacture than a consequent modification, with a reversible dial turning motor, it must be borne in mind that requirements and/or restrictions imposed by various telephone companies may vary, and, while majority thereof probably would be tolerant to using their dial recoiling spring for returning dialing finger to original position as many times as required for actuating telephone number of, for instance, the customary seven digits, some of them may object to such numerous use of their dial recoiling spring, upon the ground that the dead weight of the motor axle and dialing finger, repeated seven times, would contribute to faster wear of their dial recoiling spring, than if it is used, for instance, but once, for only the final return.

It is evident, of course, that if, in such instance, the dial turning motor 56 is replaced with a reversible motor and the relays 68–73 are connected with the latter as above said, elementary adjustments in manual pre-setting of hands 81–86, respectively, would have to be made, as follows: if, for instance, all motors involved are of the same turning speed, said hands will have to be pre-set on their respective plates 94–99 over the locations corresponding respectively to respective locations of hands 74–79 on plates 87–92; and if, for instance, motors 68A–73A are twice slower than motors 61A–66A and the reversible dial turning motor, then, of course, hands 81–86 would have to be pre-set on respective locations on plates 94–99 allowing hands 81–66 twice shorter distance of travel automatically than allowed by presetting of hands 74–79 on plates 87–92.

If there is a possibility of some telephone company refusing altogether the use of their dial recoiling spring for even one, final, return of the dialing finger to the original position on the dial plate, then, naturally, it may become advisable to add on the vacant location 150 (on the face bearing motor 67A and plate 93) a small conductive plate, similar to any one of plates 100–111, and to provide an extra unit (similar to anyone bearing motors 68A–73A respectively) and to connect said extra unit with said added small plate (in location 150), and the outgoing terminal A of the relay of said unit with reversing terminal A of the reversible dial turning motor, and include said unit, as the others, with source circuit B, for causing the dialing finger to have means for returning automatically to original position on the dial plate after dialing the last of the seven telephone digits.

However, all above said, suggested and like variations are strictly and fully within manufacturer's capacity, professional skill, discretion, caution and/or desire, and are elementary from herein basic disclosure.

Electric current to the device is carried by wires A and B. Terminals B of all aforesaid motors are permanently conductively connected with each other by electric circuits and, via the latter and an "off-on" switch 112, with wire B.

Wire A leads to a terminal close to axle of motor 61A, and is conductively connected permanently with only said axle by means of a spring wire secured by one end thereof with said terminal and resiliently extended to and over and is resiliently pressing against said axle forwardly above lever-hand 74, as indicated. Similar separate spring wires similarly secured to similar separate terminals, repectively adjacent to respective axles of motors 62A to 73A inclusive, provide for only each of said respective axles separate respective mediums of separate conductive contacts with other components only as follows:

For axle of motor 68A to plate 100 via "on-off" switch 113 and separate circuits;
For axle of motor 62A to plate 106 via direct circuit;
For axle of motor 69A top late 101 via direct circuit;
For axle of motor 63A top late 107 via direct circuit;
For axle of motor 70A to plate 102 via "on-off" switch 114 and separate circuits;
And for axles of motors 64A, 71A, 65A, 72A, 66A, 73A and 67A, respectively, to respective plates 108, 103, 109, 104, 110, 105 and 111, respectively, via shown respectively direct and respectively separate circuits.

Evidently, when switch 112 is open, each of the lever-hands 74 to 86 inclusive may be separately manually rotated to any desired circumferential position on their respective face circumferences. Evidently each of said circumferences may be divided into 12 equal sections corresponding to telephone dial 55.

To illustrate how, through medium of described device, it is possible to pre-set for future automatic dialing and telephone actuations any telephone number as may be desired at the time of said pre-setting, a telephone number "ZE 5 4058" has been chosen at random, as an example.

In order to pre-set said number for future automatic dialing, lever 74 is set over plate 87 over the latter's lower end section which corresponds to position marked "Z-operator-0" on dial 55 (FIGURE 5), lever 75 is set over plate 88 to position corresponding to position marked "DEF 3" on dial 55, lever 76 over plate 89 to position corresponding to "JKL 5," lever 77 on plate 90 to position "GHI 4," lever 78 on plate 91 to "Z-operator-0," lever 79 on plate 92 to "JKL 5,' lever 80 on plate 93 to "TUV 8." Said respective positions are respectively: full turn, $\frac{5}{12}$, $\frac{7}{12}$, $\frac{6}{12}$, full turn, $\frac{7}{12}$, and $\frac{10}{12}$ of the turn to respectively respective plates 100 to 105 inclusive and to nonconductive section 150 on respective face-circumferences of respective motors 61A to 67A inclusive, respectively, and, correspondingly, to dial stop 61 on dial 55.

In modification shown in FIGURE 4 (with one-way dial turning motor 56) the levers (or hands) 81, 82, 83, 84, 85 and 86 should be always pre-set as shown on their respective plates 94, 95, 96, 97, 98 and 99 close to the lower ends of said plates respectively for the longest clockwise rotation to their respective plates 106, 107, 108, 109, 110 and 111, respectively; however, if the dial turning motor is replaced with a reversible type, said levers (hands) should be pre-set in the manner hereabove recited in reference to said instance.

Returning to combination shown in FIGURE 4, and assuming that switches 113 and 114 are closed, as shown, we now will close switch 112. As soon as the latter is closed, the relay (or switch) 61 will close circuit to dial turning motor 56; the latter and motor 61A will become actuated, for substantially full turn of lever (or hand) 74 all way around to plate 100, which will take exactly one second during which the finger 59 will carry dial hole 60 all around to dial stop 61; thereafter lever 74 would be beyond upper end of plate 87, fallen into cavity over plate 100 and thus insulated from plate 87, such insulation will immediately de-actuate both of said motors (56 and 61A), and open relay 61, thus the dial recoiling spring will be free to start recoiling the dial 55. Since it would have to carry dead load of axle 57 and finger 59 back to original position, the recoiling of dial hole 60 will take between one to two seconds. However, the aforedescribed arrangement in the device would provide for full two seconds for such dial recoiling because, as soon as lever 74 contacts plate 100, it would de-actuate permanently motor 61A and actuate motor 68A and its lever 81 for its full turn over plate 94 and therebeyond which would take exactly two seconds (due to said slower speed of motor 68A) during which time the dial motor 56 apparently will remain deactuated. However, as soon as lever 81 departs from plate 94 and assumes position over plate 106 the motor 68A will become permanently de-actuated, relay (or switch) 62 will close circuit to dial turning motor 56, and the dial motor 56 and motor 62A and lever 75 thereof will become actuated for as long as it will take lever 75 to rotate its pre-set $\frac{5}{12}$ of the turn travel to and over plate 101; since both motors, 56 and 62A, are each of the same speed, finger 59 will move the hole 60, and thus dial 55, also $\frac{5}{12}$ of its respective circumference, thus bringing the dial hole, dormantly over mark "DEF 3," to finger or dial stop 61; by exactly that time the lever 75 will part with plate 88 and assume position over plate 101 thereby opening relay 62 and de-actuating permanently motor 62A and actuating motor 69A and its lever 82 which simultaneously will de-actuate dial motor 56 and insure said de-actuation of the latter again for full two seconds, more than enough time for the dial recoiling spring to return the dial and finger 59 (in hole 60) to original position since now it would have to return only $\frac{5}{12}$ of the full turn. As soon as lever 82 assumes position over plate 107, the motor 69A will become permanently de-actuated, relay 63 will close circuit to dial turning motor 56, and the dial motor 56, motor 63A and its lever 76 will become actuated for exactly $\frac{7}{12}$ of a second and of the circumferences of each motor. This will move finger 59 and dial hole 60 $\frac{7}{12}$ of the dial circumference which amounts to dialing "JKL 5." Following the same procedure, when lever 76 assumes position over plate 102, motor 63A will become permanently de-actuated, relay 63 will open, and the dial motor 56 will become de-actuated for two full seconds by means of simultaneous actuation of motor 70A and lever 83; when latter moves over plate 108, motor 70A de-actuates permanently, relay 64 closes and motors 56 and 64A and lever 77 actuate for $\frac{6}{12}$ of a second and circumferences which dials "GHI 4;" then lever 77 is over plate 103, relay 64 opens, motor 64A de-actuates permanently, dial motor 56 de-actuates for two seconds while motor 71A and lever 84 are actuated. When lever 84 moves over plate 109, motor 71A de-actuates permanently, relay 65 closes and, motor 56 and 65A and lever 78 actuate for one second or full turn which dials "Z-operator-0," then lever 78 reaches plate 104, relay 65A opens, motor 65A de-actuates permanently, dial motor 56 de-actuates and motor 72A and lever 85 actuate for two seconds. Then lever 85 reaches plate 110, motor 72A de-actuates permanently, relay 66 closes, motors 56 and 66A and lever 79 become actuated for 7/12 of a second and of the circumferences which dials "JKL 5;" then lever 79 reaches plate 105, relay 66 opens, motor 66A de-actuates permanently, motor 56 de-actuates and motor 73A and lever 86 actuate for two seconds. When lever 86 reaches plate 111, motor 73 de-actuates permanently, relay 67 closes, motors 56 and 67A and lever 80 become actuated for 10/12 of a second and of the circumferences which dials "TUV 8." When lever 80 reaches the vacant space 150 and parts from plate 93 it will open relay 67 and de-actuate the dial motor 56 and motor 67A permanently or until the device is manually re-set for a new operation.

If it becomes necessary or desired to pre-set dialing for telephone company operator only, switch 113 should be opened, and the lever 74 on plate 87 should be set to position it occupies on FIGURE 1.

If it becomes necessary or desired to pre-set dialing for "Information" (dial number "113") or for "Repair" (dial number "114"), switch 113 should be left closed, but switch 114 should be opened, the levers 81 and 82 should be set in shown positions, then levers 74 and 75 should be set respectively to positions each corresponding to "1" on dial 55 (3/12 of respective circumference to plates 100 and 101 respectively, corresponding to 3/12 of dial circumference to dial stop 61), then, if it is desired to pre-set for "Information," lever 76 should be set to position corresponding to "DEF 3" on dial 55 (5/12 of circumference to plate 102), or, if it is desired to pre-set for "Repair," said lever 76 should be set to position corresponding to "GHI 4" on dial 55 (6/12 of circumference to plate 102).

Figure 6:
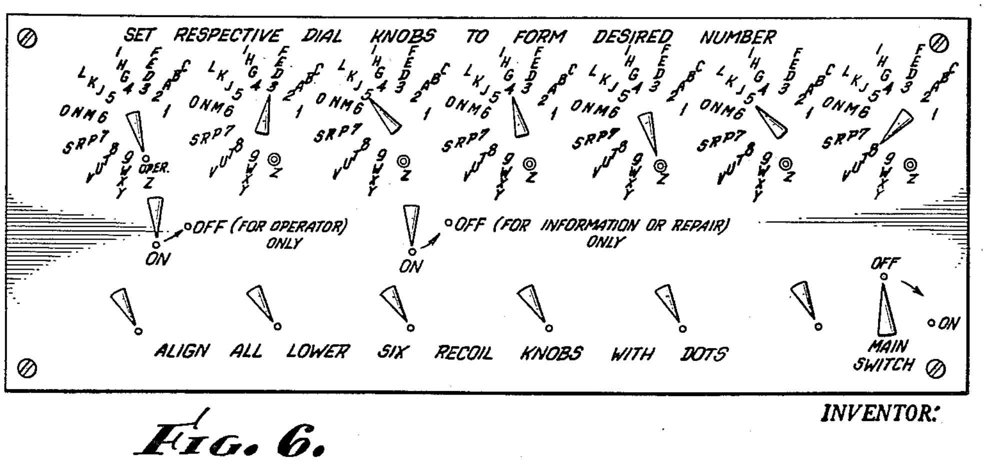
FIGURE 6 is a front view of the cover-board, for the panel, and of the manually operated pre-setting knobs pointed at guide marks on said board.

For convenience of manual number pre-setting a panel front-board may be provided, for instance, as shown in FIGURE 6, bearing appropriate markings and instructions for guidance. Such board should have appropriate openings for inserting therethrough protruding axles of motors 61A–73A and of the switches 113, 114 and 112, then securing to said axles, in proper alignment with levers 74–86 respectively, and conveniently with levers of said switches, the customary, nonconductive, pointed hand-knobs adapted for convenient manual dialing, substantially as shown in FIGURE 6. The turning of said knobs respectively to appropriate shown markings would effect the desired setting of the device.

Either of the shown and described devices evidently may be easily adapted for useful application with various requirements where future automatic dialing of various compound or single-digit telephone numbers may be needed, for instance, in connection with automatic alarm systems, burglar or fire alarms and like, for example, in systems described in my U.S. Patent No. 2,883,460, or in my now pending patent application under Serial No. 847,214, or for future automatic delivery via telephone system of pre-recorded messages to various telephone numbers, and like, in conjunction with appropriate timing devices.

If greater than herein shown scope of digits in various telephone number combinations may be required, evidently the capacity of shown devices may be easily increased, for instance, in reference to the predetermined setting as shown in FIGURE 1, by either enlarging the panel diameter, or by reducing the widths of the governing plates and speed ratio of the lever motor, and so forth; and in reference to the free-choice pre-setting as shown in FIGURE 4, by multiplication of the pre-setting components-units, and/or by combining a plurality of said devices, or by introducing solenoid and/or electronic components which may carry out the principles of this invention within smaller containers, or by using one motor to rotate several axles successively in conjunction with a multitiming device, and so forth, which, of course, in view of present disclosure, would require merely a technical skill rather than inventive imagination.

Therefore, while the principles of this invention have been herein exemplified in only a few structures, a wide range of further modifications and/or enlargements is permissible and apparently quite foreseeable upon revealed herein teachings and disclosed basic concept, without jeapordizing this patent protection; therefore it is clearly understood, of course, that said patent protection is not limited to said herein structures, but extends to and embraces the full scope of any one or more of the annexed claims.

I claim as my invention:

1. For telephone apparatus of the type having rotary dial with dial-finger-hole a telephone numbers actuating device dependent upon plurality of electric motors and source of electric energy with first and second poles and comprising a first electric motor with first and second electric terminals, means for securing said motor in front of said telephone apparatus, an axle aligned with center of said rotary dial and turnable by said motor contraclockwise at turning speed adapted for telephone dialing, a finger for engaging dial-finger-hole and secured by crossbar with said axle parallel thereto, a second electric motor with first and second electric terminals, a shaft turnable by said second electric motor at turning speed co-ordinated with the turning speed of said axle in ratio dependent upon number of axle actuations affected by and within one turn of the shaft, a conductive springy means perpendicularly secured to said shaft and having inverted end, a non-conductive member secured for said inverted end to rotate thereover in contact therewith when the second motor is actuated, plurality of conductive plates, means for securing said plates flatly and circumferentially over said non-conductive member under the path of said inverted end and there separated from each other, electric circuit means for connecting plurality of conductive plates respectively with first terminal of the first motor, electric circuit means for connecting second terminal of the first motor with first of said poles of said source of electric energy and with first terminal of the second motor, electric circuit means for connecting second terminal of the second motor and the conductive springy means with the second of said poles, electric switches for closing and opening electric circuit connections for actuating and de-actuating the electric motors, the inverted end engagement over width of conductive plate for actuating the first motor for length of time dependent upon the engaged width of the conductive plate whereby said width governs the extent of dialing advance of the rotary dial from its dormant position and is predetermined various and variable dependent upon various and variable extent of said advance required for dialing various and variable digit in a telephone number.

2. In conjunction with telephone apparatus of the type having finger operated rotary dial and dial-finger-holes and stationary dial-finger-stop, and means for returning said dial to original position after being forcibly turned therefrom and after turning means is de-actuated, and in conjunction with source of electric energy having first and second poles, a telephone numbers actuating device for actuating telephone number and numbers of one and more telephone digits and comprising a first electric motor with first and second electric terminals, means for securing said motor in front of the telephone apparatus, an axle turnable contraclockwise by said motor at speed adapted for telephone dialing and aligned with center of the telephone rotary dial, a finger secured by crossbar with and parallel to said axle for engaging telephone dial-finger-hole which dormantly is first below the stationary telephone-dial-finger-stop, a second electric motor with first and second electric terminals, a shaft turnable by the second electric motor at a speed slower than of said axle, a conductive springy means secured to the shaft perpendicularly thereto and having inverted end, a plurality of conductively associated with each other flat conductive plates of variable widths, the latter respectively dependent on various and variable extent of telephone dial turn from dormant position required for dialing various and variable digits in a telephone number and numbers, a non-conductive member secured for said inverted end to rotate thereover in contact therewith when the second electric motor is actuated, means for securing flatly over said non-conductive member one and more of said conductive plates under the path of said inverted end and there at a distance from each other dependent upon width of preceding plate thereof under said path, an electric circuit means for connecting one and plurality of said conductive plates with first terminal of the first motor, an electric circuit means for connecting second terminal of the first motor with first of said poles of said source of electric energy and with first terminal of the second motor, an electric circuit means for connecting second terminal of the second motor and the conductive springy means with second of said poles, electric switches for closing and opening electric circuit connections for actuating and de-actuating the motors; and the inverted end engagement of the conductive plate actuates the first motor, and the turning speed of the shaft and width of the engaged conductive plate determine the length of time the first motor remains actuated, and the width of the conductive plate under the path of the inverted end thereby governs the extent of the dialing turn of the telephone dial from its starting position when said rotary dial is engaged by said finger.

3. In conjunction with telephone apparatus having rotary dial and dial-finger-holes and stationary dial-finger-stop, and in conjunction with means for returning said dial to original position after being turned therefrom, and in conjunction with source of electric energy having first and second poles, and for a telephone-dial-turning-electric-motor-means including dial turning electric motor with first and second electric terminals, means for holding said motor in front of the telephone apparatus, axle turnable by said motor contraclockwise at telephone-dialing-speed, finger secured by crossbar with said axle parallel thereto for engaging telephone-dial-finger-hole dormantly directly under the stationary dial-finger-stop, electric circuit means for connecting first electric terminal of said motor with first of said poles of said source of electric energy, plurality of solenoid operated switches, electric circuit means for connecting each of said switches respectively and successively with second terminal of said motor and with second of said poles via a governing means for closing and opening said connection of each of said switches respectively;

a governing device for closing and opening said connection of each of said switches respectively for respectively predetermined and set length of time and comprising a separate electric motor with first and second electric terminals, a shaft turnable by said separate motor at speed slower than of said axle, a conductive springy means secured to said shaft perpendicularly thereto and having inverted end, a non-conductive member secured for said inverted end to rotate thereover in contact therewith, a plurality of conductively associated with each other and conductive plates of variable widths respectively dependent upon various and variable extent of telephone-rotary-dial turn from dormant position required for dialing various and variable digits in various and variable telephone number and numbers, means for securing over said non-conductive member one and more of said conductive plates flatly and successively under the patch of said inverted end and there separated from each other by a width dependent upon width of the preceding plate under said path, electric circuit means for connecting one and plurality of so secured conductive plates with second electric terminal of the dial turning motor, electric circuit means for connecting the first terminal of the separate electric motor with the first of said poles of said source of electric energy, electric circuit means for connecting the second electric terminal of the separate motor and the conductive springy means with the second of said poles of said source of electric energy, electric switches for closing and opening electric circuit connections for actuating and de-actuating said separate electric motor.

4. In conjunction with telephone apparatus having rotary dial and dial-finger-holes and stationary dial-finger-stop, and in conjunction with means for returning said dial to original position after being turned therefrom, and in conjunction with source of electric energy having first and second poles, and for telephone-dial-turning-electric-motor-means including dial turning motor with first and second electric terminals, means for holding said motor in front of the telephone apparatus, axle turnable by said motor contraclockwise at telephone-dialing-speed, finger secured by-cross bar with said axle parallel thereto for engaging telephone-dial-finger-hole dormantly directly under the stationary dial-finger-stop, electric circuit means for connecting first electric terminal of said motor with first of said poles of said source of electric energy, plurality of solenoid operated switches, electric circuit means for connecting each of said switches respectively and successively with second electric terminal of said motor and with second of said poles via a governing means for closing said connections of each of said switches respectively;

a governing device for closing and opening said connection of each of said switches respectively for respectively predetermined and pre-set length of time and comprising plurality of separate motorized electrically operated units each respectively including a separate electric motor with first and second electric terminals, conductive shaft turnable by said motor, conductive springy means perpendicularly secured to the shaft and having inverted end, non-conductive member secured for said inverted end to rotate thereover in contact therewith, a broken-ring-like conductive plate with two separated ends, means for securing said plate over said nonconductive member under the path of said inverted end; plurality of supplemental conductive plates each respectively of size and shape for fitting individually between and apart from the separated ends of respective broken-ring-like conductive plate, means for securing individual supplemental conductive plate over the non-conductive member under the path of the inverted end and between and apart from the separated ends of the broken-ring-like conductive plate;

plurality of separate electric circuit means respectively for connecting respectively the first of said poles of said source of electric energy with first electric terminal of each motor of said units, and, in each of the respective units, its broken-ring-like conductive plate with second electric terminal of its respective motor, and the second pole of said source of electric energy with the shaft of only the first unit, and the shaft of respectively successive unit with the supplemental conductive plate in the respectively preceding unit; electric switches for closing and opening electric circuit connection for actuating and de-actuating the device;

the turning speeds of the respective shafts in the alternate units are respectively co-ordinated with the respective turning and returning speeds of telephone rotary dial; the second electric terminal of the first, third and in the same order other successively connected motors of the respective units is respectively susceptible of being connected with respective solenoid operated switch for respective connection via the latter when closed with the second electric terminal of the dial turning motor; in each respective unit each of its respective conductive springy means is susceptible of being manually pre-turned and pre-set for its respective inverted end to assume there-upon dependent position over any predetermined point under its path over the broken-ring-like conductive plate for turning therefrom only, when its respective motor is electrically actuated, to over a point between the separated ends of said plate, and, thereby, various and variable circular distances and, thereby, various and variable lengths of time dependent upon said manual pre-turning and pre-setting of the conductive springy means before the device is electrically actuated.

References Cited in the file of this patent

UNITED STATES PATENTS

| | | |
|---|---|---|
| 1,882,106 | Wise | Oct. 11, 1932 |
| 1,927,413 | Morin | Sept. 19, 1933 |
| 2,579,983 | Thornton | Dec. 25, 1951 |
| 2,656,417 | Kilburg | Oct. 20, 1953 |
| 2,768,238 | Resinger | Oct. 23, 1956 |
| 2,813,931 | De Forest | Nov. 19, 1957 |
| 2,830,119 | Zimmerman | Apr. 8, 1958 |
| 2,866,850 | Duca | Dec. 30, 1958 |
| 2,883,460 | Andrews | Apr. 21, 1959 |